US010412772B2

(12) United States Patent
Mukherjee et al.

(10) Patent No.: US 10,412,772 B2
(45) Date of Patent: Sep. 10, 2019

(54) METHODS, SYSTEMS, AND COMPUTER READABLE MEDIA FOR USING ACCESS POINT NAME (APN) INDEPENDENT SUBSCRIBER BINDINGS

(71) Applicant: Oracle International Corporation, Redwood Shores, CA (US)

(72) Inventors: Abhishek Mukherjee, Bangalore (IN); John Scott Gilmore, Cary, NC (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/672,255

(22) Filed: Aug. 8, 2017

(65) Prior Publication Data
US 2019/0053291 A1  Feb. 14, 2019

(51) Int. Cl.
*H04W 76/11* (2018.01)
*H04W 8/02* (2009.01)
(Continued)

(52) U.S. Cl.
CPC .............. *H04W 76/11* (2018.02); *H04W 8/02* (2013.01); *H04W 8/26* (2013.01); *H04W 92/24* (2013.01)

(58) Field of Classification Search
CPC ......... H04W 76/11; H04W 8/02; H04W 8/26; H04W 92/24
(Continued)

(56) References Cited

U.S. PATENT DOCUMENTS 8,615,237 B2  12/2013 Baniel et al.
8,737,304 B2   5/2014 Karuturi et al.
(Continued)

FOREIGN PATENT DOCUMENTS

CN  101277541 A  10/2008
CN  102239481 A  11/2011
(Continued)

OTHER PUBLICATIONS

Notice of Allowance and Fee(s) Due for U.S. Appl. No. 15/048,410 (dated May 25, 2018).
Calhoun et al., "Diameter Network Access Server Application," RFC 4005, pp. 1-85 (Aug. 2005).
Communication pursuant to Article 94(3) EPC for European Application No. 12 751 783.7 (dated Mar. 15, 2017).
Letter Regarding Notice of Grant for Chinese Patent Application No. ZL201280018297.3 (dated Jul. 4, 2016).
Official Notice of Grant for Japanese Patent Application No. 2013-556860 (dated Apr. 26, 2016).
(Continued)

*Primary Examiner* — Charles N Appiah
*Assistant Examiner* — Nicole M Louis-Fils
(74) *Attorney, Agent, or Firm* — Jenkins, Wilson, Taylor & Hunt, P.A.

(57) ABSTRACT

Methods, systems, and computer readable media for using access point name (APN) independent subscriber bindings. In some examples, a method is performed by a Diameter signaling router (DSR) for a telecommunications network. The method includes receiving, from a policy related node, a policy related message including a subscriber identifier associated with a subscriber; determining that the policy related message lacks APN information; after determining that the policy related message lacks APN information, using the subscriber identifier and preconfigured APN information to generate or identify a binding between the subscriber and a policy and charging rules function (PCRF) server of a pool of PCRF servers, or using the subscriber identifier to identify a first bound policy and charging rules function (PCRF) server of a pool of PCRF servers; and sending, to the identified PCRF server, the policy related message received from the policy related node.

16 Claims, 7 Drawing Sheets

(51) Int. Cl.
*H04W 8/26* (2009.01)
*H04W 92/24* (2009.01)

(58) Field of Classification Search
USPC .......................................................... 370/328
See application file for complete search history.

(56) References Cited

U.S. PATENT DOCUMENTS

| | | | |
|---|---|---|---|
| 8,825,060 | B2 | 9/2014 | McCann et al. |
| 8,942,747 | B2 | 1/2015 | Marsico |
| 9,215,133 | B2 | 12/2015 | Baniel et al. |
| 9,830,214 | B1 | 11/2017 | McGinn et al. |
| 10,102,087 | B2 | 10/2018 | Dreyer et al. |
| 2004/0098612 | A1 | 5/2004 | Lee et al. |
| 2007/0242637 | A1 | 10/2007 | Dynarski et al. |
| 2009/0080440 | A1 | 3/2009 | Balyan et al. |
| 2009/0305684 | A1 | 12/2009 | Jones et al. |
| 2010/0284336 | A1 | 11/2010 | Rui et al. |
| 2010/0299451 | A1 | 11/2010 | Yigang et al. |
| 2010/0311392 | A1 | 12/2010 | Stenfelt et al. |
| 2011/0040845 | A1 | 2/2011 | Cai et al. |
| 2011/0202660 | A1* | 8/2011 | Pandya ............... H04L 12/14 709/227 |
| 2011/0302289 | A1 | 12/2011 | Shaikh et al. |
| 2012/0072585 | A1 | 3/2012 | Yang et al. |
| 2012/0131639 | A1 | 5/2012 | Alex et al. |
| 2012/0202550 | A1 | 8/2012 | Marsico |
| 2012/0224531 | A1* | 9/2012 | Karuturi ............... H04L 67/327 370/328 |
| 2012/0246325 | A1* | 9/2012 | Pancorbo Marcos ....................... H04L 63/102 709/227 |
| 2013/0003529 | A1 | 1/2013 | Lopez Nieto et al. |
| 2013/0036215 | A1 | 2/2013 | Kupinsky et al. |
| 2013/0339783 | A1 | 12/2013 | Fernandez Alonso et al. |
| 2014/0064183 | A1 | 3/2014 | Mann et al. |
| 2015/0055446 | A1 | 2/2015 | Avula et al. |
| 2015/0236863 | A1 | 8/2015 | Castro Castro |
| 2015/0237669 | A1 | 8/2015 | Abou-Assali et al. |
| 2016/0142294 | A1* | 5/2016 | Mann ............... H04L 45/304 370/351 |
| 2016/0216878 | A1* | 7/2016 | Ramprasad ............ H04W 4/50 |
| 2017/0242765 | A1 | 8/2017 | Dreyer et al. |
| 2018/0098245 | A1* | 4/2018 | Livanos ............... H04L 47/11 |

FOREIGN PATENT DOCUMENTS

| | | |
|---|---|---|
| CN | 103477661 B | 10/2016 |
| EP | 2 220 841 B1 | 9/2011 |
| JP | H10-98470 A | 4/1998 |
| JP | H11-224219 A | 8/1999 |
| JP | 2004-242326 A | 8/2004 |
| JP | 4041038 B2 | 1/2008 |
| JP | 5938052 B2 | 6/2016 |
| WO | WO 2012/118967 A1 | 9/2012 |

OTHER PUBLICATIONS

Notification of the First Office Action for Chinese Application No. 201280018297.3 (dated Jan. 15, 2016).
Letter Regarding Final Rejection for Japanese Patent Application No. 2013-556860 (dated Nov. 17, 2015).
Letter Regarding Office Action for Japanese Patent Application No. 2013-556860 (dated Jul. 21, 2015).
Extended European Search Report for European Application No. 12751783.7 (dated Jul. 22, 2014).
Notice of Allowance for U.S Appl. No. 13/409,949 (dated Apr. 24, 2014).
Notice of Allowance and Applicant Initiated Interview Summary for U.S. Appl. No. 13/409,949 (dated Jan. 14, 2014).
Final Office Action for U.S. Appl. No. 13/409,949 (dated Sep. 19, 2013).
Communication of European publication number and information on the application of Article 67(3) EPC for European Application No. 12751783.7 (dated Dec. 11, 2013).
Non-Final Office Action for U.S. Appl. No. 13/409,949 (dated Feb. 15, 2013).
Fajardo et al., "Diameter Base Protocol," RFC 6733, pp. 1-152 (Oct. 2012).
Notification of Transmital of the International Search Report and the Written Opinion of the International Searching Authority, or the Declaration for International Patent Application No. PCT/US2012/027281 (dated Jun. 15, 2012).
"Multi-Protocol Routing Agent User's Guide," 910-6404-001 revision A. Policy Management, Tekelec, pp. 1-70 (Jun. 2012).
Non-Final Office Action for U.S. Appl. No. 15/048,410 (dated Jan. 9, 2018).
"3rd Generation Partnership Project; Technical Specification Group Services and System Aspects; Policy and charging control architecture (Release 11)," 3GPP TS 23.203, V11.7.0 (Sep. 2012).
"3rd Generaton Partnership Project; Technical Specification Group Core Network and Terminals; Study on PCRF failure and restoration (Release 10)," 3GPP TR 29.816, V10.0.0 (Sep. 2010).

* cited by examiner

METHODS, SYSTEMS, AND COMPUTER READABLE MEDIA FOR USING ACCESS POINT NAME (APN) INDEPENDENT SUBSCRIBER BINDINGS

TECHNICAL FIELD

The subject matter described herein relates generally to managing subscriber bindings. More particularly, the subject matter described herein relates to methods, systems, and computer readable media for using APN independent subscriber bindings.

BACKGROUND

For efficiency and cost reduction, some telecommunications providers bind subscribers to specific policy and charging rules function (PCRF) servers selected from a pool of PCRF servers for the telecommunications network, e.g., a long-term evolution (LTE) network. The PCRF is configured to make and manage policy decisions for the bound subscribers, so it can be more efficient in terms of computing and network resources for a subscriber to always use the same PCRF server. By binding subscribers to specific PCRF servers, different PCRF servers do not have to retrieve and maintain the data for subscribers bound to other PCRF servers.

Some telecommunications providers require that an access point name (APN) be provided to generate and/or locate subscriber bindings. However, if a policy related node does not have access to APN information, the policy related node cannot generate and/or locate subscriber bindings in those scenarios.

Accordingly, there exists a need for methods, systems, and computer readable media for using APN independent subscriber bindings.

SUMMARY

The subject matter described herein relates to methods, systems, and computer readable media for using access point name (APN) independent subscriber bindings. A Diameter Signaling Router (DSR) is configured to create and/or use APN independent subscriber bindings. In some examples, by creating APN independent subscriber bindings, a DSR can correlate session creation requests from APN unaware policy related nodes and can use one or more subscriber keys to find relevant subscriber bindings.

According to one method for using APN independent subscriber bindings, the method is performed by a DSR for a telecommunications network. The method includes receiving, from a policy related node, a policy related message including a subscriber identifier associated with a subscriber; determining that the policy related message lacks APN information; after determining that the policy related message lacks APN information, using the subscriber identifier and preconfigured APN information to generate or identify a binding between the subscriber and a policy and charging rules function (PCRF) server of a pool of PCRF servers, or using the subscriber identifier to identify a first bound policy and charging rules function (PCRF) server of a pool of PCRF servers; and sending, to the identified PCRF server, the policy related message received from the policy related node.

According to one system, the system includes a DSR including at least one processor. The system also includes a policy binding manager implemented using the at least one processor. The policy binding manager is configured for: receiving, from a policy related node, a policy related message including a subscriber identifier associated with a subscriber; determining that the policy related message lacks APN information; after determining that the policy related message lacks APN information, using the subscriber identifier and preconfigured APN information to generate or identify a binding between the subscriber and a policy and charging rules function (PCRF) server of a pool of PCRF servers, or using the subscriber identifier to identify a first bound PCRF server of a pool of PCRF servers; and sending, to the identified PCRF server, the policy related message received from the policy related node.

The subject matter described herein may be implemented in hardware, software, firmware, or any combination thereof. As such, the terms "function", "node" or "module" as used herein refer to hardware, software and/or firmware components for implementing the feature(s) being described. In some examples, the subject matter described herein may be implemented using a non-transitory computer readable medium having stored thereon computer executable instructions that when executed by one or more processors of a computer cause the computer to perform operations.

Computer readable media suitable for implementing the subject matter described herein include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described herein may be located on a single device or computing platform or may be distributed across multiple devices or computing platforms.

DETAILED DESCRIPTION

Figure 1:
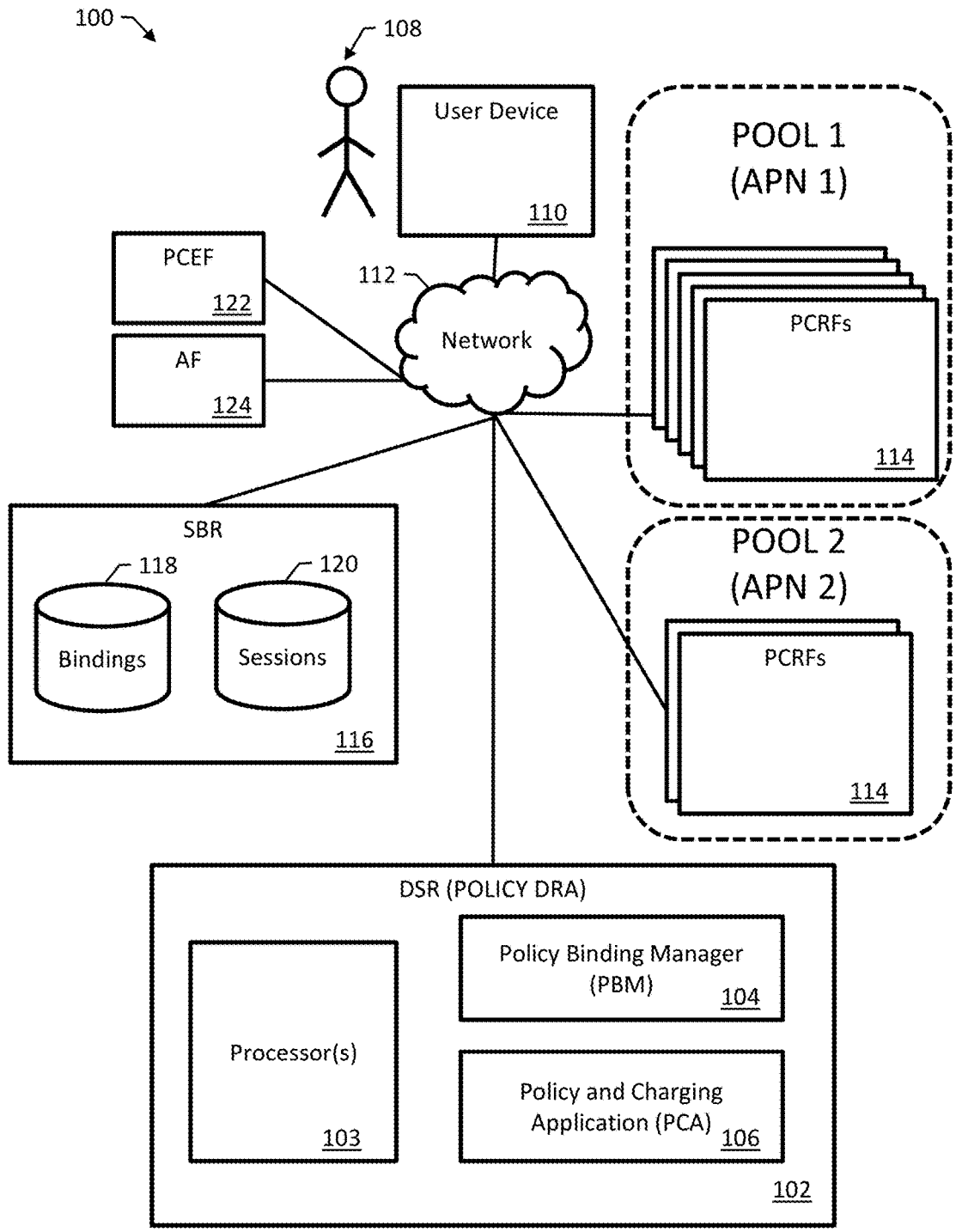
FIG. 1 is a block diagram of an example telecommunications network that includes a Diameter signaling router (DSR) configured to implement a policy binding manager (PBM) and a policy and charging application (PCA)

FIG. 1 is a block diagram of an example telecommunications network 100 that includes a Diameter signaling router (DSR) 102, also referred to as a policy Diameter routing agent (P-DRA), configured to implement a policy binding manager (PBM) 104 and a policy and charging application (PCA) 106. DSR 102 can be a system of one or more computers configured, by virtue of appropriate programming, to implement various functions including, for example, a policy binding manager (PBM) 104 and a PCA 106. DSR 102 may include at least one processor 103 for implementing PBM 104 and/or PCA 106.

Telecommunications network 100 includes at least one subscriber 108 accessing telecommunications network 100 using a user device 110 communicating with DSR 102 over a data communications network 112. Data communications network 112 can be a combination of networks, e.g., a radio access network coupled to a core network for carrying signaling messages for the telecommunications network 100.

User device 110 can include one or more computers, one or more computer readable mediums storing executable instructions for the computers, and input/output devices such as keyboards, display screens, touchpads, or other types of records or data. For example, user device 110 can be a tablet or mobile phone.

A policy and charging enforcement function (PCEF) is a system of one or more computers configured, by virtue of appropriate programming, as part of a 3rd Generation Partnership Project (3GPP) policy charging control (PCC) architecture. The elements of the PCC provide access, resource, and quality-of-service (QoS) control. PCEF 122 is configured to enforce any policy and charging control (PCC) decisions made by a policy and charging rules function (PCRF) and handle service data flows (e.g., forwarding or dropping packets related to a requested service). A PCRF communicates with PCEF 122, e.g., via a Gx interface. The Gx interface can be used to install, modify, and remove policy and charging commands and rules between a PCRF and PCEF 122 in either pull or push modes.

PCEF 122 may be configured for traffic detection and resultant policy enforcement. PCEF 122 can provide information to a PCRF about user device 110 and any requested services. For example, PCEF 122 may provide a subscriber identifier (ID), an internet protocol (IP) address of user device 110, and an identifier of a network that provides the requested service.

PCEF 122 can be implemented on a computer system comprising one or more processors. For example, PCEF 122 may be implemented in a server such as a packet gateway (PGW) or a computer system integrated with the PGW. The PGW can provide connectivity from user device 110 to external packet data networks by being the point of exit and entry of traffic for or/and from user device 110. PCEF 122, in combination with the PGW, can perform policy enforcement, packet filtering, charging support, packet screening, and the like.

In operation, PCA 106 creates bindings between subscribers and PCRF servers selected from a pool of PCRF servers 114. PCA 106 then routes all policy messages for a given subscriber to the PCRF server that currently hosts that subscriber's policy rules. PCA 106 can perform other functions such as topology hiding to hide network topology information, such as the number and identities of PCRF servers 114 from untrusted external networks.

A PCRF is a system of one or more computers configured, by virtue of appropriate programming, as part of a 3GPP PCC architecture. In some examples, a PCRF or related functionality is implemented on one or more pools of PCRF servers 114. In some examples, each pool of PCRF servers 114 can be configured, by virtue of appropriate programming, to operate as a distributed computing system.

In operation, PCRF servers 114 function in real-time or near real-time to determine policy rules in a telecommunication network. PCRF servers 114 can, in some cases, operate at the network core and access user information and other specialized functions in a centralized manner. Some PCRFs are regionalized and some serve a fixed (configured) set of subscribers. PCRF servers 114 can aggregate information to and from telecommunications network 100, operational supports systems, and other sources in real time, which can be useful for the creation of rules and automatically making policy decisions for each user active on telecommunications network 100.

Using PCRF servers 114, telecommunications network 100 can offer multiple services, QoS levels, and charging rules. PCRF servers 114 can efficiently and dynamically route and prioritize network traffic. PCRF servers 114 can provide a unified view of user context based on one or more of device, network, location, and billing data. PCRF servers 114 can provide key inputs to revenue assurance and bandwidth management.

PCA 106 maintains bindings using a subscriber binding repository (SBR) 116 including a bindings database 118. SBR 116 can host both session and binding databases can provide a distributed, scalable, and high availability database function to PCA 106 for storing and managing the session data and the subscriber-PCRF binding data. Binding database 118 stores bindings between subscribers and PCRF severs, and a sessions database 120 stores Diameter session information related to policy sessions.

Policy sessions can be established using multiple Diameter interfaces such as Gx, Gxx, Gx-Prime, Rx and S9. A session can be characterized as binding-capable or binding dependent, depending on whether or not a binding can be created over it.

Gx, Gxx and S9 interfaces are binding-capable
Rx, Rx over S9, and Gx-Prime interfaces are binding dependent A session over a binding-capable interface will be eligible to establish a binding to a PCRF server, while a session over a binding dependent interface will rely on an existing binding to a PCRF server but cannot typically create a new binding by itself.

In order for PCA 106 to route all messages from a subscriber (perhaps through multiple interfaces and devices) to the same PCRF server, PCA 106 is typically configured to identify the subscriber by the information in the incoming Diameter request messages. One subscriber can be associated with multiple subscriber identifiers depending on the access networks and device types used.

The subscriber identifiers can be called subscriber keys or keys. Messages that can cause creation of a subscriber-PCRF binding can contain the subscriber's device international mobile subscriber identity (IMSI), which can be used to uniquely identify the subscriber. IMSI can be used as the subscriber anchor key in binding database 118.

Session initiating messages may also contain additional information to identify the subscriber. This information, which may include a Mobile Station Integrated Services Digital Network (MSISDN) number, an IPv4 address, or an IPv6 address prefix, is referred to as subscriber alternate keys. Database records with alternate keys are established by binding-capable sessions and can be used to identify the subscriber in binding dependent sessions.

For example, a Gx credit control request initial (CCR-I) message contains the IMSI anchor key under normal circumstances and may also contain an MSISDN, an IPv4 address, and an IPv6 address. After a binding is established between the subscriber and a PCRF, binding dependent sessions containing one or more of the subscriber keys can be routed to the PCRF using an alternate key.

An application function (AF) is a system of one or more computers configured, by virtue of appropriate programming, as part of a 3GPP PCC architecture. AF 124 can be configured to provide session related information to the PCRF in support of PCC rule generation. AF 124 may also be configured to provide application or services, e.g., in a PDN, to user device 110. A PCRF communicates with AF 124, e.g., via an Rx interface. In some examples, AF 124 may be a proxy call session control function (P-CSCF) or other node.

In some examples, in order to initiate and establish a long-term evolution (LTE) session, an initial establishment of a Gx session may be performed, which is largely conducted by DSR 102. After the successful creation of the subscriber Gx session, subsequent processing may involve AF 124 communicating with a previously determined (e.g., bound) PCRF 114 in order to establish a related Rx session and to communicate a binding dependent message (e.g., an authorization request message or an Rx AA-Request message). In some examples, AF 124 may route an authorization request message towards DSR 102 for identifying the appropriate supporting PCRF 114. After receiving the authorization request message, DSR 102 may perform the required session binding by determining the correct PCRF and routing the request message to the designated PCRF.

In some examples, subscriber keys, such as IMSI and MSISDN, are used to establish and locate subscriber bindings (e.g., subscriber-to-PCRF bindings) in networks utilizing one or more pools of PCRF servers 114. In such examples, binding using IMSI and MSISDN may require APN information as a qualifier to establish or identify subscriber bindings. For example, in some networks, binding dependent policy nodes (e.g., AF 124) that use IMSI and MSISDN keys to correlate (i.e. to locate subscriber bindings) are required to include APN information in relevant messages to DSR 102. However, problems can arise if network operators deploy networks or nodes in ways such that some policy nodes cannot access APN information. In particular, in those scenarios where policy related nodes cannot access APN information, IMSI and MSISDN may not be usable as correlation keys for generating or identifying subscriber bindings.

In some examples, DSR 102 or a related entity may use user-configurable rules, e.g., different pool modes, for determining how subscriber bindings are to be established and/or identified. Some example pool modes include a single pool mode and a multiple pool mode. In a single pool mode, telecommunications network 100 may be configured such that all APNs to use the same pool of PCRF servers 114. In a multiple pool mode, telecommunications network 100 may be configured such that each pool of a plurality of pools of PCRF servers 114 is associated or assigned one or more APNs. In some examples, if using IMSI and/or MSISDN as anchor keys, a pool mode (e.g., a multiple pool mode) may require that session creation messages (e.g., a Gx CCR-I message or an Rx AA-request) be associated with APN information before subscriber bindings can be established or identified.

PBM 104 can be any suitable entity (e.g., software executing on processor 103) for performing one or more aspects associated with using APN independent subscriber bindings (e.g., subscriber-to-PCRF bindings). For example, PBM 104 can be configured to allow DSR 102 to create, identify, or use APN independent subscriber bindings, thereby allowing DSR 102 to correlate session creation requests from APN unaware policy nodes which use IMSI and MSISDN subscriber keys to find those bindings. In some examples, PBM 104 or some functionality thereof can be integrated with or separate from DSR 102 and/or PCA 106.

In some examples, PBM 104 can receive, manage and process user-configurable (e.g., predetermined) APN information and may use this information to establish or locate subscriber bindings for policy related messages that lack APN information. For example, PBM 104 may be configured, by virtue of appropriate programming, for receiving, from a policy related node, a policy related message including a subscriber identifier associated with a subscriber; determining that the policy related message lacks APN information; after determining that the policy related message lacks APN information, using the subscriber identifier and preconfigured APN information to generate or identify a binding between the subscriber and a policy and charging rules function (PCRF) server of a pool of PCRF servers, or using the subscriber identifier to identify a first bound PCRF server of a pool of PCRF servers; and sending, to the identified PCRF server, the policy related message received from the policy related node.

PBM 104 can be configured with user-configurable rules, e.g., APN related settings, by any appropriate technique for establishing user-configurable rules, e.g., by virtue of loading a file containing the rules, by virtue of a machine-to-machine interface (MMI), by virtue of an application programming interface (API), or by virtue of providing, to a user device, a graphical user interface (GUI) configured to receive the user-configurable rules from a system administrator. Since the rules are user-configurable, a network operator can configure PBM 104 to respond appropriately to a particular network configuration.

For example, telecommunications network 100 may be configured to use multiple pools of PCRF servers 114, where each pool may be associated with a particular APN. In this example, a first pool may handle traffic from APN '1' and may include numerous PCRF servers and a second pool may handle traffic from APN '2' and may include only two PCRF servers. Continuing with this example, the system administrator may supply user-configurable rules that instruct PBM 104 to use APN '1' as a default APN for all policy related messages lacking APN information that need binding lookups.

In another example, where telecommunications network 100 may be configured to use multiple pools of PCRF servers 114, the system administrator may supply user-configurable rules that allow PBM 104 to use different APNs as default APNs for policy related messages based on message types, communications interfaces, or other derivable information.

The user-configurable rules can include information for indicating when and/or for how long such APN related settings are in effect. For example, the system administrator may supply user-configurable rules that indicate default APN information is only used during off-peak times, a particular pool mode is selected, and/or when executing a particular DSR software version. In this example, if APN related settings are not in effect (e.g., default APN information is not utilized), DSR 102 or a related entity may discard policy related messages lacking APN information that need binding lookups, may send an error message to a requesting entity, and/or may notify the system administrator or another entity.

In some examples, PBM 104 can be configured with rules that are only enforced for certain messages that lack APN information. For example, a default APN may be provided to SBR 116 for performing a subscriber lookup only when a related message (e.g., a session creation message) lacks APN information.

It will be appreciated that FIG. 1 is for illustrative purposes and that various entities and/or functionality described above in relation to FIG. 1 may be changed, altered, added, or removed. For example, some nodes and/or functions may be combined into a single entity. In another example, some nodes and/or functions may be distributed across multiple nodes and/or platforms.

Figure 2:
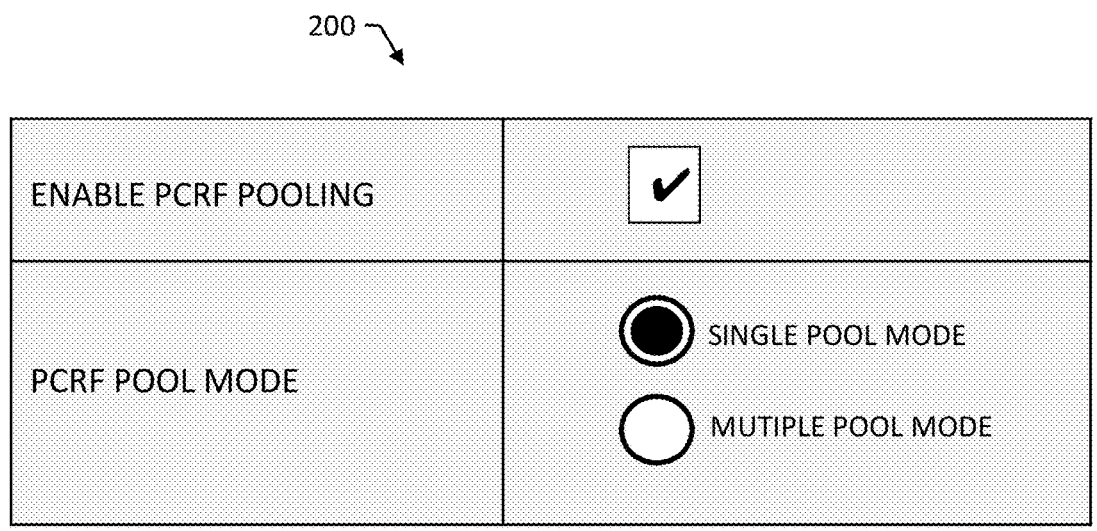
FIG. 2 illustrates an example graphical user interface (GUI) for selecting a policy and charging rules function (PCRF) pool mode.

FIG. 2 illustrates an example GUI 200 for selecting a PCRF pool mode. GUI 200 may represent a configuration page or portion thereof for inputting or modifying various DSR related options, rules, and settings that can configure and/or affect the functionality of DSR 102, PBM 104, or PCA 106.

As depicted in FIG. 2, GUI 200 includes a UI element for enabling or disabling PCRF pooling via a check box or toggle switch. GUI 200 also includes radio buttons for selecting a PCRF pool mode, such as "Single Pool Mode" or "Multiple Pool Mode". In some examples, the radio buttons can be disabled (e.g., unable to be selected) when the "Enable PCRF Pooling" option is in an unchecked or disabled state. In some examples, the radio buttons can be enabled when the "Enable PCRF Pooling" option is in a checked or enabled state.

In some examples, after selecting the "Single Pool Mode" option, a confirmation message may be displayed indicating that this mode will cause all new binding capable session creation messages to be routed to a default PCRF Pool. Sessions that are bound to other pools may continue to exist until they are torn down by Diameter signaling or an SBR audit procedure.

In some examples, after applying the "Single Pool Mode", a warning message may be displayed when a user (re)visits GUI 200 or attempts to change related settings. For example, the warning message may indicate that "Single Pool Mode" is active and all binding capable session creation messages will be routed to the default pool only." In this example, any attempt to remove a policy routing table (PRT) mapping for the default pool may be disallowed by displaying an appropriate error message.

In some examples, after applying the "Single Pool Mode", DSR 102 or a related entity may be configured (e.g., via appropriate programming) such that binding capable session creation messages are routed to a default pool regardless of the APN configuration. DSR 102 or a related entity may also be configured such that APN information is not mandatory for session creation messages attempting to correlate using a non-specific subscriber key, e.g., IMSI or MSISDN. For example, DSR 102 or a related entity may process a session creation message and if a binding is successfully found the session creation message may be routed to the bound PCRF. In some examples, if a binding dependent session creation message fails to route using IMSI or MSISDN for correlation and does not have an APN, DSR 102 or a related entity may not raise or display an error. In some examples, if a binding dependent session creation message fails to route using IMSI or MSISDN for correlation and does have an APN, DSR 102 or a related entity may raise or display an error.

In some examples, after applying the "Single Pool Mode", DSR 102 or a related entity may be configured (e.g., via appropriate programming) such that if a binding correlation is attempted using IMSI or MSISDN for a message having an APN value, DSR 102 or a related entity may search for a final bound session (e.g., a binding from PCEF with PCRF confirmation accept response) using the provided APN value. If a bound PCRF is found, a related PCRF identifier may be returned. If a final bound session is not found with the provided APN value, a binding failure result or related message may be returned.

In some examples, after applying the "Single Pool Mode", DSR 102 or a related entity may be configured (e.g., via appropriate programming) such that if a binding correlation is attempted using IMSI or MSISDN for a binding dependent message that does not have an APN value, DSR 102 or a related entity may search for the first final bound session for a related subscriber. If a bound PCRF is found, a related PCRF identifier may be returned. If a final bound session is not found for the related subscriber, a binding failure result or related message may be returned.

In some examples, after selecting the "Multiple Pool Mode" option, a confirmation message may be displayed indicating that this mode will cause all new binding capable session creation messages to be routed to PCRF Pools based on APN settings. The confirmation message may also indicate that all binding dependent session creation messages that correlate using IMSI or MSISDN should include an APN in a Called-Station-Id AVP or another location and that if the APN is not present, a default APN value will be used, if available. In some examples, the confirmation message may further indicate that if default APN information is not configured or available, binding correlation may not be attempted using IMSI or MSISDN.

In some examples, after applying the "Multiple Pool Mode", DSR 102 or a related entity may be configured (e.g., via appropriate programming) such that if a binding dependent session creation message (an Rx message) attempts to correlate (e.g., identify a subscriber binding) using a non-specific subscriber key (e.g., IMSI or MSISDN) and the message does not have a Called-Station-Id AVP or APN information therein, DSR 102 or a related entity may use a user-configurable default APN value to search for a final bound session for the subscriber. In some examples, if a default APN value is not configured, a correlation will not be attempted using a non-specific subscriber key.

It will be appreciated that FIG. 2 is for illustrative purposes and that other user-configurable rules and/or settings may be inputted or modified for handing PCRF pooling scenarios and related bindings.

Figure 3:
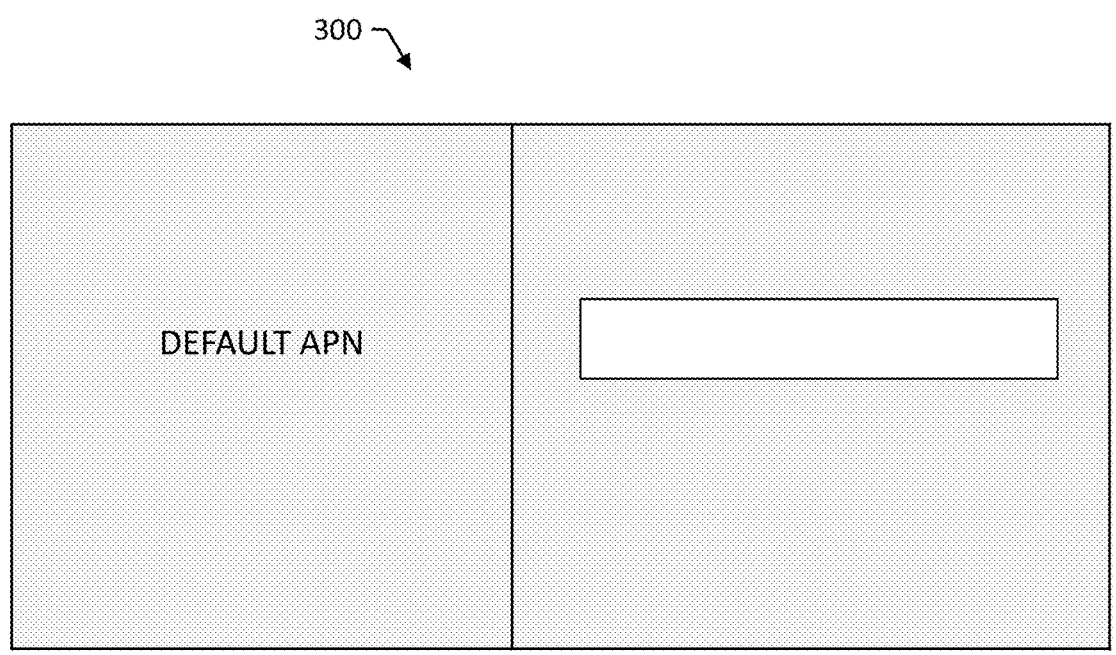
FIG. 3 illustrates an example GUI for providing user-configurable default APN information for identifying bindings from messages that lack APN information.

FIG. 3 illustrates an example GUI 300 for providing user-configurable default APN information for identifying bindings from messages that lack APN information. GUI 300 may represent a configuration page or portion thereof for inputting or modifying various DSR related options, rules, and settings that can configure and/or affect the functionality of DSR 102, PBM 104, or PCA 106.

As depicted in FIG. 3, GUI 300 includes a UI element for inputting and/or modifying a default APN for a non-specific binding correlation. For example, a text box may be usable to enter an APN or other APN related identifier.

Example APN information that may be inputted may include a network identifier, an operator identifier, an operator's web address, a Packet Data Network (PDN) identifier, or a service identifier.

In some examples, after inputting the user-configurable default APN information and saving or otherwise applying the information, PBM 104 or another entity may create or enforce at least one rule that instructs PBM 104 or another entity to use the entered APN information for all policy related messages (e.g., session creation messages) lacking APN information when performing subscriber binding lookups.

For example, a binding dependent session creation message may be received by DSR 102 and DSR 102 or related entity (e.g., PBM 104) may identify that the session creation message lacks APN information. In this example, DSR 102 or related entity (e.g., PBM 104) may use one or more subscriber keys (e.g., IMSI and/or MSISDN) associated with the message along with a user-configurable APN value.

It will be appreciated that FIG. 3 is for illustrative purposes and that other user-configurable rules and/or settings may be inputted or modified for establishing and identifying subscriber bindings. For example, default APN related information may be configured for use based on various message criteria, operator preferences, and/or historical data.

Figure 4:
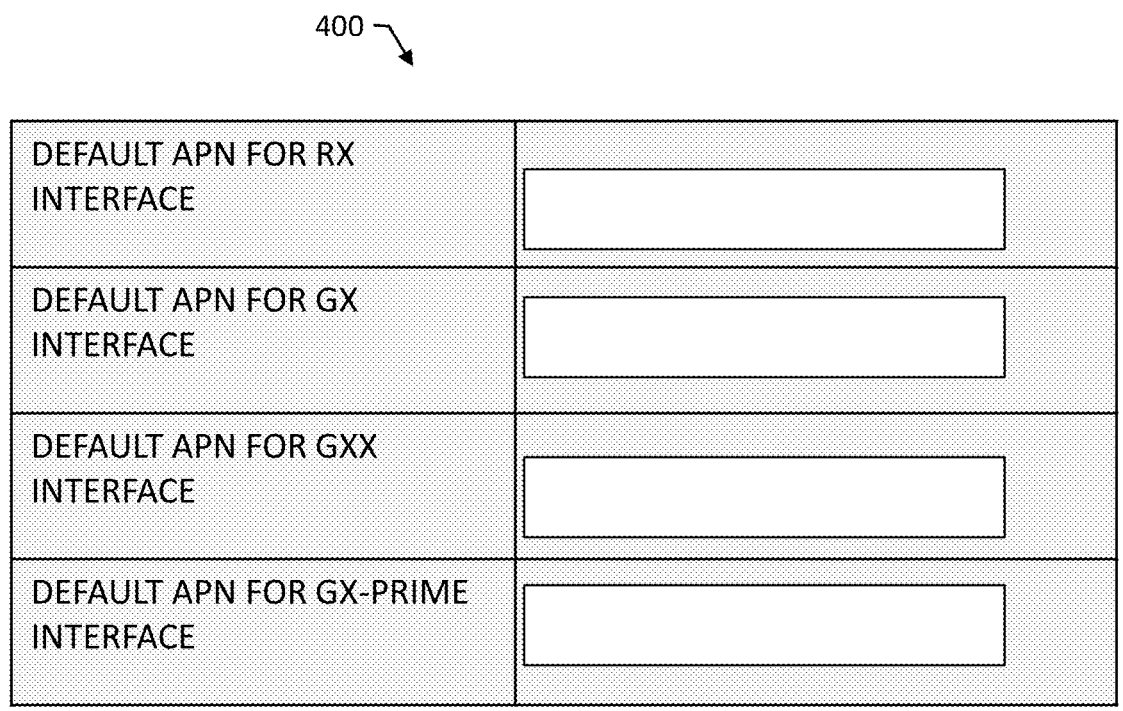
FIG. 4 illustrates an example GUI for providing user-configurable default APN information for various types of communications interfaces.

FIG. 4 illustrates an example GUI 400 for providing user-configurable default APN information for various types of communications interfaces. GUI 400 may represent a configuration page or portion thereof for inputting or modifying various DSR related options, rules, and settings that can configure and/or affect the functionality of DSR 102, PBM 104, or PCA 106.

As depicted in FIG. 4, GUI 400 includes UI elements for inputting and/or modifying a default APN for different communications interfaces. In particular, GUI 400 includes a text box for inputting a default APN for an Rx interface, a text box for inputting a default APN for a Gx interface, a text box for inputting a default APN for a Gxx interface, and a text box for inputting a default APN for a Gx-prime interface.

In some examples, after inputting the user-configurable default APN information and saving or otherwise applying the information, PBM 104 or another entity may create or enforce at least one rule that instructs PBM 104 or another entity to use appropriate user-configurable APN information based on the communications interface associated with a policy related message (e.g., a session creation message) lacking APN information when performing a subscriber binding lookup.

For example, a Gx-Prime session creation message may be received by DSR 102 and DSR 102 or related entity (e.g., PBM 104) may identify that the session creation message lacks APN information. In this example, DSR 102 or related entity (e.g., PBM 104) may identify, by querying SBR 116, a subscriber binding using one or more subscriber keys (e.g., IMSI an/or MSISDN) associated with the message along with a user-configurable APN information (e.g., a first APN value that was inputted by a user and for Gx messages that lack APN information).

In another example, an Rx session creation message may be received by DSR 102 and DSR 102 or related entity (e.g., PBM 104) may identify that the session creation message lacks APN information. In this example, DSR 102 or related entity (e.g., PBM 104) may identify, by querying SBR 116, a subscriber binding using one or more subscriber keys (e.g., IMSI an/or MSISDN) associated with the message along with user-configurable APN information (e.g., a second APN value that was inputted by a user and for Rx messages that lack APN information).

It will be appreciated that FIG. 4 is for illustrative purposes and that other user-configurable rules and/or settings may be inputted or modified for establishing and identifying subscriber bindings. For example, default APN related information may be configured for use based on ports, applications, or messages types (e.g., Diameter command codes).

Figure 5:
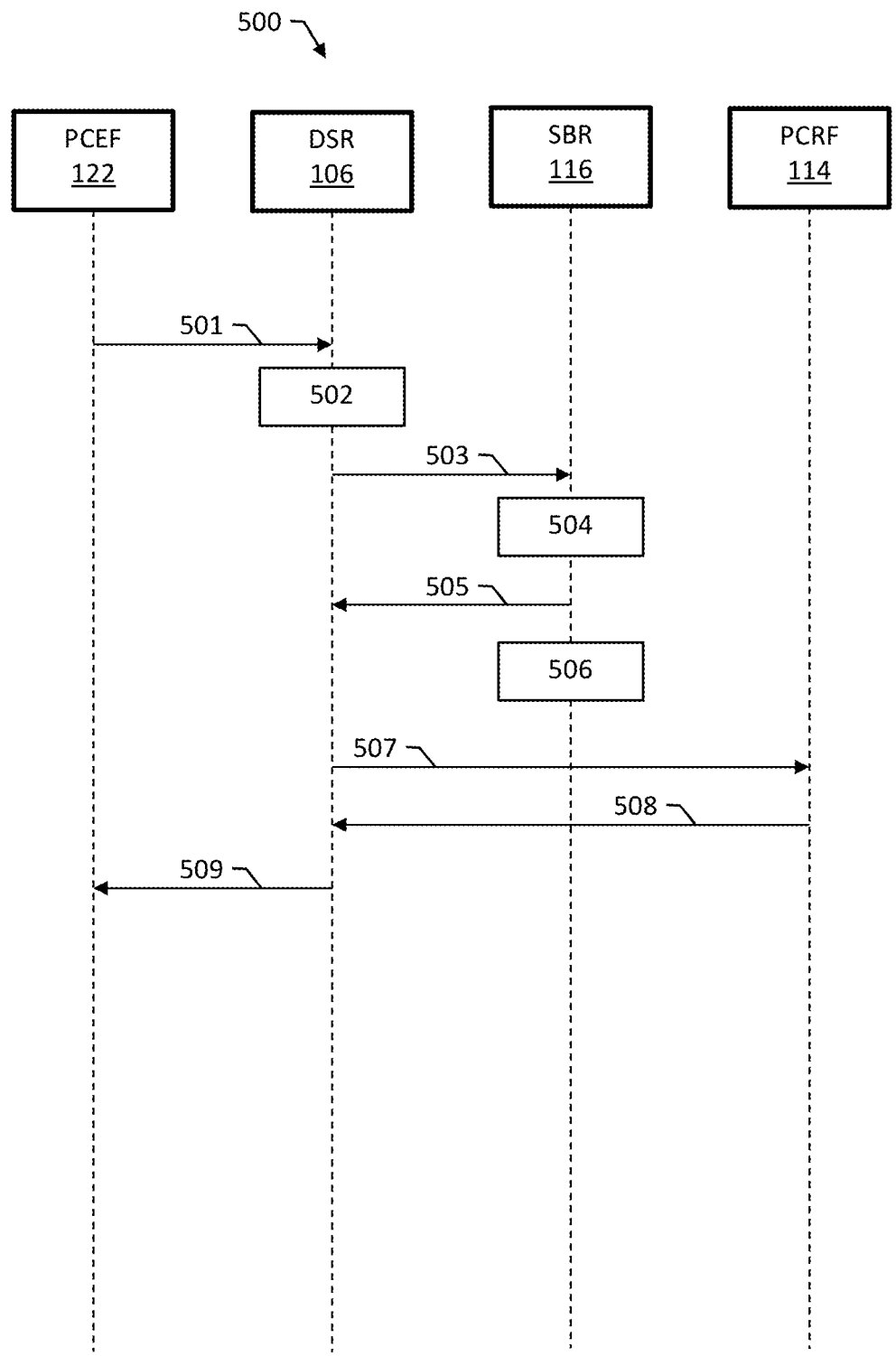
FIG. 5 is a message flow diagram illustrating a message sequence for identifying and/or creating a binding triggered by a policy and charging enforcement function (PCEF)

FIG. 5 is a message flow diagram illustrating a message sequence 500 for identifying a binding triggered by PCEF 122. In some examples, message sequence 500 may occur prior to a subscriber binding being generated.

Referring to FIG. 5, in step 501, PCEF 122 may initiate message sequence 500 by sending a CCR-I message to DSR 102.

In step 502, DSR 102 or PBM 104 may determine whether user-configurable APN information is needed. For example, if APN information is lacking in a received message, e.g., a session creation message received from binding dependent interfaces (e.g. Rx, Rx over S9, Gx-Prime). PBM 104 may use appropriate user-configurable APN information, if available.

In some examples, DSR 102 may select a PCRF server 114 for handling the message flow, e.g., prior to determining whether a subscriber binding does not currently exists.

In step 503, DSR 102 may query SBR 116 using subscriber information (e.g., an IMSI and/or MSISDN from the message) and appropriate APN information. In some examples, DSR 102 or a related entity may use one or more user-configurable rules and/or settings to determine or select an appropriate APN for a particular message.

In step 504, SBR 116 may perform a subscriber binding lookup using the subscriber information and the APN information.

In step 505, SBR 116 may send a response message indicating whether a binding currently exists for the subscriber.

In step 506, a subscriber binding may be generated, e.g., after determining that a subscriber binding does not currently exists.

In step 507, DSR 102 may send a CCR-I message to PCRF server 114.

In step 508, DSR 102 may receive a credit control answer initial (CCA-I) message from PCRF 114.

In step 509, DSR 102 may send a CCA-I message back to PCEF 122 after optionally performing topology hiding.

In some examples, DSR 102 may exchange messages with SBR 116 to create a session, and SBR 116 may optionally exchanges messages with other SBRs to create alternate keys.

Table 1 illustrates an example ImsiApnAnchorKey table before binding creation, and Table 2 illustrates the example ImsiApnAnchorKey table after binding creation. The ImsiApnAnchorKey table may have more or fewer columns that those illustrated; for example, the table can include a session number for each row so that each row has a unique session number value.

TABLE 1

| ImsiApnAnchorKey Table Before Binding Creation | | |
|---|---|---|
| IMSI | APN | Bound PCRF |

TABLE 2

| ImsiApnAnchorKey Table After Binding Creation | | |
|---|---|---|
| IMSI | APN | Bound PCRF |
| 12355 | APN1 | PCRF1 |

It will be appreciated that message sequence 500 in FIG. 5 is for illustrative purposes and that different and/or additional messages and/or actions may be used for generating or identifying subscriber bindings. It will also be appreciated that various messages and/or actions described herein with regard to message sequence 500 may occur in a different order or sequence.

Figure 6:
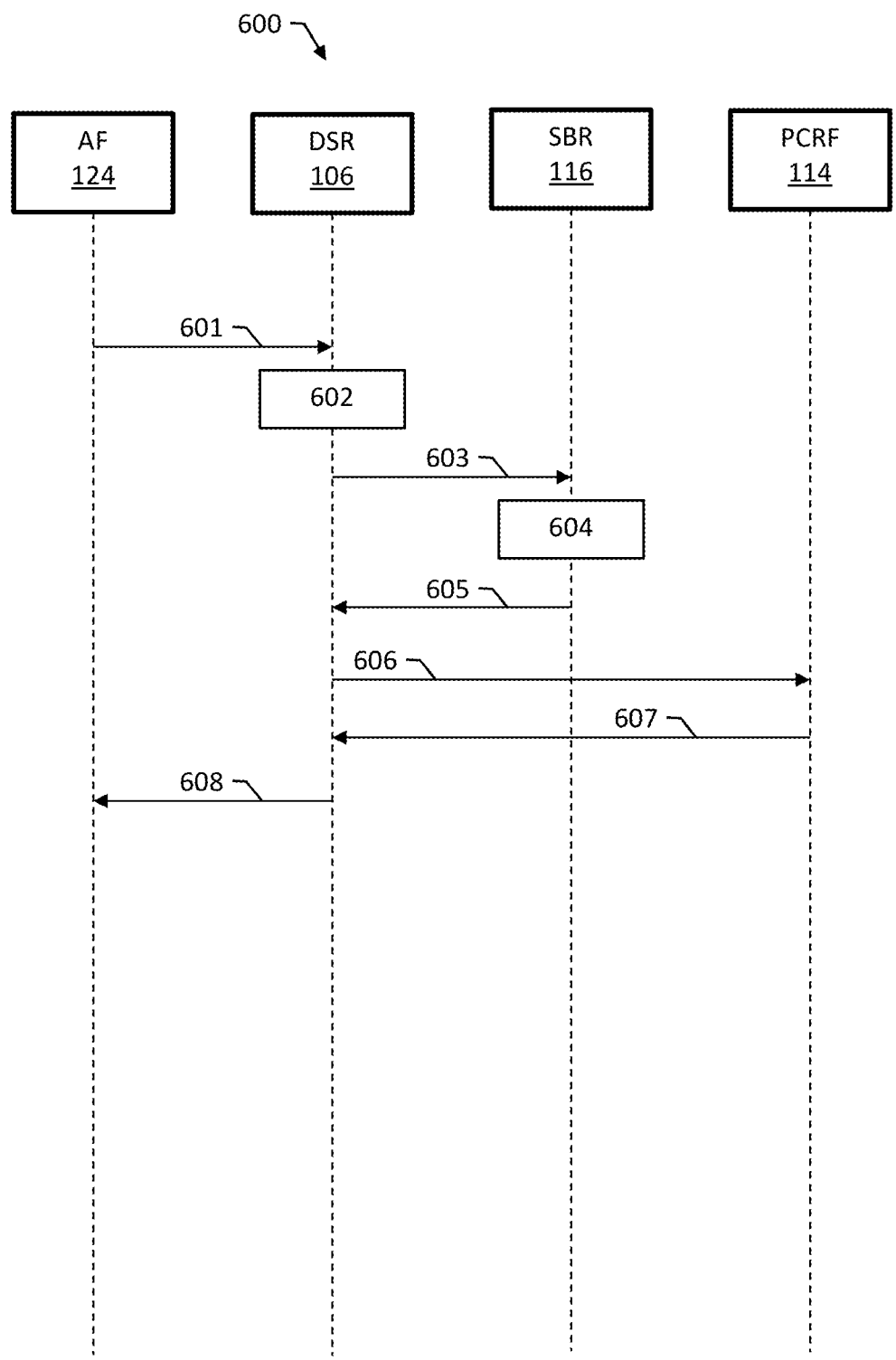
FIG. 6 is a message flow diagram illustrating a message sequence for identifying a binding triggered by an application function (AF)

FIG. 6 is a message flow diagram illustrating a message sequence 600 identifying a binding triggered by AF 124. In some examples, message sequence 600 may occur after a subscriber 108 and user device 110 is bound to PCRF 'X' 114, e.g., via a binding capable session request.

Referring to FIG. 6, in step 601, AF 124 may initiate message sequence 600 by sending an Rx AA-request message to DSR 102.

In step 602, DSR 102 or PBM 104 may determine whether user-configurable APN information is needed. For example, if APN information is lacking in a received message, and DSR 102 is configured in "Multiple Pool Mode", PBM 104 may identify and use appropriate user-configurable APN information, if available.

In step 603, DSR 102 may query SBR 116 using subscriber information (e.g., an IMSI and/or MSISDN from the message) and appropriate APN information. In some examples, DSR 102 or a related entity may use one or more user-configurable rules and/or settings to determine or select an appropriate APN for a particular message; or DSR 102, when configured in "Single Pool Mode", may query SBR 116 using subscriber information (e.g., an IMSI and/or MSISDN from the message) and without APN information.

In step 604, SBR 116 may perform a subscriber binding lookup using the subscriber information and the APN information when operating in "Multiple Pool Mode"; or, SBR 116, may perform a subscriber binding lookup using the subscriber information only (i.e. without the APN information) to find the first bound PCRF when operating in "Single Pool Mode"

In step 605, SBR 116 may send a response message indicating that a binding currently exists for the subscriber.

In step 606, DSR 102 may send an Rx AA-request message to PCRF server 114.

In step 607, DSR 102 may receive an Rx AA-answer message from PCRF 114.

In step 608, DSR 102 may send an Rx AA-answer message back to AF 124 after optionally performing topology hiding.

It will be appreciated that message sequence 600 in FIG. 6 is for illustrative purposes and that different and/or additional messages and/or actions may be used for identifying subscriber bindings. It will also be appreciated that various messages and/or actions described herein with regard to message sequence 600 may occur in a different order or sequence.

Figure 7:
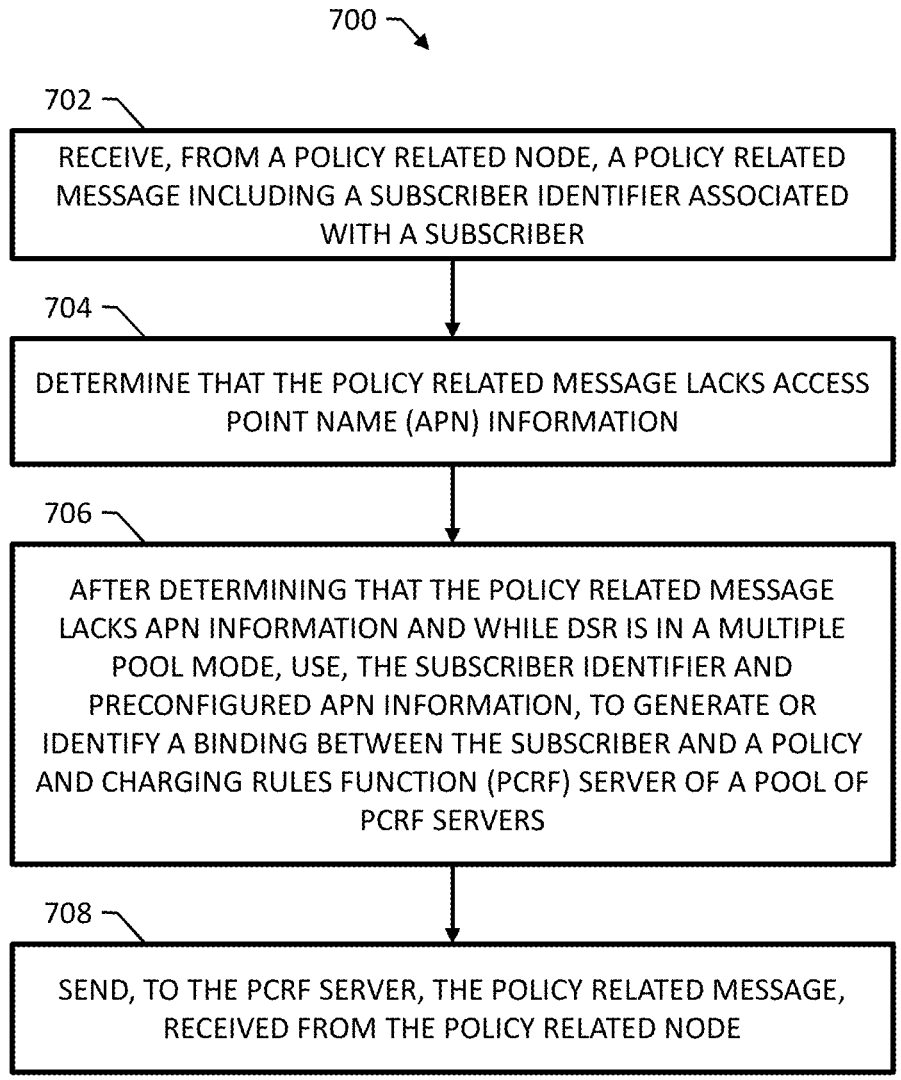
FIG. 7 is a flow diagram of an example method for using APN independent subscriber bindings in a telecommunications network.

FIG. 7 is a flow diagram of an example method 700 for using APN independent subscriber bindings in a telecommunications network. The method is performed by a system of one or more computers, e.g., DSR 102 of FIG. 1 executing PCA 106 and/or PBM 104. The system can provide, to a user device, a graphical user interface (GUI) configured to receive user-configurable rules and/or settings to control and/or affect method 700. In some examples, method 700 may include steps 702, 704, 706, and/or 708.

In step 702, a policy related message including a subscriber identifier associated with a subscriber may be received from a policy related node.

In some embodiments, a policy related message may include a Diameter Gx message, a Diameter Rx message, a Diameter Gx session creation request message, or a Diameter Rx session creation request message.

In some embodiments, a subscriber identifier may include an IMSI or an MS ISDN number.

In step 704, it may be determined that the policy related message lacks APN information.

In some embodiments, preconfigured APN information may include user-configurable default APNs for different interfaces, ports, applications, or messages types.

In some embodiments, preconfigured APN information may include a network identifier, an operator identifier, an operator's web address, a PDN identifier, or a service identifier.

In step 706, after determining that the policy related message lacks APN information and while the DSR is in a multiple pool mode, the subscriber identifier and preconfigured APN information may be used to generate or identify a binding between the subscriber PCRF server of a pool of PCRF servers.

In some embodiments, if a DSR is in "Single Pool Mode", a subscriber identifier may be use to identify a bound PCRF server of a pool of PCRF servers, e.g., without using preconfigured APN information.

In some embodiments, a policy related node may include an AF, a policy enforcement node, a policy rules node, a PCEF, a PCRF server, or a DSR.

In some embodiments, a pool of PCRF servers may be one of a plurality of pools of PCRF servers, wherein each pool of PCRF servers may be grouped to handle traffic associated with a particular APN.

In step 708, the policy related message received in step 702 may be sent to the PCRF server identified in step 706.

In some embodiments, prior to receiving the policy related message, a subscriber may be bound to a PCRF server by storing an association between one or more subscriber identifiers for the subscriber and the PCRF server in SBR 116, causing all policy related messaging for the subscriber to be routed to the bound PCRF server.

In some embodiments, DSR or a related module may provide, to a user device, a GUI (e.g., GUI 200 or GUI 300) configured to input or modify the preconfigured APN information, wherein the preconfigured APN information may include a user-configurable default APN.

Accordingly, while the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

The subject matter described herein for using APN independent subscriber bindings can improve the functionality a DSR, PCRF selection, and/or subscriber binding. For example, by using user-configurable APN settings, DSR 102 or a related module can create and/or identify policy or subscriber (e.g., subscriber-to-PCRF) bindings in operator network(s) that restrict the knowledge of APN information to certain network nodes. In other words, operators can use DSR 102 to route policy related messages from policy related nodes that are unaware of APN information without having to resort to non user-identity keys, such as IP addresses. Hence, a DSR capable of APN independent subscriber bindings may generally be applicable to wider policy networks than existing DSRs. It should also be noted that a computing platform that implements the subject matter described herein may comprise a special purpose computing device usable to route binding related messages that lack APN information.

It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for using access point name (APN) independent subscriber bindings, the method comprising:
    at a Diameter signaling router (DSR) for a telecommunications network, wherein the DSR is configured for using preconfigured default access point names (APNs) to route messages that lack APN information while in a multiple pool mode:
        providing, to a user device, a graphical user interface (GUI) configured to input or modify preconfigured APN information, wherein the preconfigured APN information includes user-configurable default APNs for different interfaces, ports, applications, or messages types, wherein the user-configurable default APNs includes a first default APN associated with a first Diameter interface and a second default APN associated with a second Diameter interface;
        receiving, from a policy related node, a policy related message including a subscriber identifier associated with a subscriber, wherein the policy related message is associated with the first Diameter interface;
        determining that the policy related message lacks APN information and that the policy related message is associated with the first Diameter interface;
        after determining that the policy related message associated with the first Diameter interface lacks APN information and while the DSR is in the multiple pool mode, using the subscriber identifier and the preconfigured APN information associated with the first Diameter interface to generate or identify a binding between the subscriber and a first policy and charging rules function (PCRF) server of a pool of PCRF servers associated with the first default APN; and
        sending, to the first PCRF server, the policy related message received from the policy related node.

2. The method of claim 1, comprising:
    prior to receiving the policy related message, binding the subscriber to the first PCRF server by storing an association between one or more subscriber identifiers for the subscriber and the first PCRF server in a subscriber binding repository (SBR), causing all policy related messaging for the subscriber to be routed to the first PCRF server.

3. The method of claim 1, comprising:
    changing the DSR from the multiple pool mode to a single pool mode;
    receiving, from the policy related node, a second policy related message including a second subscriber identifier associated with a second subscriber;
    determining that the second policy related message lacks APN information;
    after determining that the second policy related message lacks APN information and while the DSR is in the single pool mode, using the second subscriber identifier to identify a bound policy and charging rules function (PCRF) server of a second pool of PCRF servers; and
    sending, to the bound PCRF server, the second policy related message received from the policy related node.

4. The method of claim 1, wherein the pool of PCRF servers is one of a plurality of pools of PCRF servers, wherein each pool of PCRF servers are grouped to handle traffic associated with a particular APN.

5. The method of claim 1, wherein the policy related message includes a Diameter Gx message, a Diameter Rx message, a Diameter Gx session creation request message, or a Diameter Rx session creation request message.

6. The method of claim 1, wherein the subscriber identifier includes an international mobile subscriber identity (IMSI) or a Mobile Station Integrated Services Digital Network (MSISDN) number.

7. The method of claim 1, wherein the preconfigured APN information includes a network identifier, an operator identifier, an operator's web address, a Packet Data Network (PDN) identifier, or a service identifier.

8. A system for using access point name (APN) independent subscriber bindings, the system comprising:
    a Diameter signaling router (DSR) including at least one processor, wherein the DSR is configured for using preconfigured default access point names (APNs) to route messages that lack APN information while in a multiple pool mode; and
    a policy binding manager implemented by the at least one processor for:
        providing, to a user device, a graphical user interface (GUI) configured to input or modify preconfigured APN information, wherein the preconfigured APN information includes user-configurable default APNs for different interfaces, ports, applications, or messages types, wherein the user-configurable default APNs includes a first default APN associated with a first Diameter interface and a second default APN associated with a second Diameter interface;
        receiving, from a policy related node, a policy related message including a subscriber identifier associated with a subscriber, wherein the policy related message is associated with the first Diameter interface;
        determining that the policy related message lacks APN information and that the policy related message is associated with the first Diameter interface;
        after determining that the policy related message associated with the first Diameter interface lacks APN information and while the DSR is in the multiple pool mode, using the subscriber identifier and the preconfigured APN information associated with the first Diameter interface to generate or identify a binding between the subscriber and a first policy and charging rules function (PCRF) server of a pool of PCRF servers associated with the first default APN; and
        sending, to the first PCRF server, the policy related message received from the policy related node.

9. The system of claim 8, wherein the policy binding manager is configured for:
    prior to receiving the policy related message, binding the subscriber to the first PCRF server by storing an association between one or more subscriber identifiers for the subscriber and the first PCRF server in a subscriber binding repository (SBR), causing all policy related messaging for the subscriber to be routed to the first PCRF server.

10. The system of claim 8, wherein the policy binding manager is configured for:
changing the DSR from the multiple pool mode to a single pool mode;
receiving, from the policy related node, a second policy related message including a second subscriber identifier associated with a second subscriber;
determining that the second policy related message lacks APN information;
after determining that the second policy related message lacks APN information and while the DSR is in the single pool mode, using the second subscriber identifier to identify a bound policy and charging rules function (PCRF) server of a second pool of PCRF servers; and
sending, to the bound PCRF server, the second policy related message received from the policy related node.

11. The system of claim 8, wherein a policy related node includes an application function (AF), a policy enforcement node, a policy rules node, a policy charging and enforcement function (PCEF), a second PCRF server, or a second DSR.

12. The system of claim 8, wherein the pool of PCRF servers is one of a plurality of pools of PCRF servers, wherein each pool of PCRF servers are grouped to handle traffic associated with a particular APN.

13. The system of claim 8, wherein the policy related message includes a Diameter Gx message, a Diameter Rx message, a Diameter Gx session creation request message, or a Diameter Rx session creation request message.

14. The system of claim 8, wherein the subscriber identifier includes an international mobile subscriber identity (IMSI) or a Mobile Station Integrated Services Digital Network (MSISDN) number.

15. The system of claim 8, wherein the preconfigured APN information includes a network identifier, an operator identifier, an operator's web address, a Packet Data Network (PDN) identifier, or a service identifier.

16. A non-transitory computer readable medium storing executable instructions that, when executed by one or more computers comprising a Diameter Signaling Router (DSR), cause the one or more computers to perform operations comprising:
at a Diameter signaling router (DSR) for a telecommunications network, wherein the DSR is configured for using preconfigured default access point names (APNs) to route messages that lack APN information while in a multiple pool mode:
providing, to a user device, a graphical user interface (GUI) configured to input or modify preconfigured APN information, wherein the preconfigured APN information includes user-configurable default APNs for different interfaces, ports, applications, or messages types, wherein the user-configurable default APNs includes a first default APN associated with a first Diameter interface and a second default APN associated with a second Diameter interface;
receiving, from a policy related node, a policy related message including a subscriber identifier associated with a subscriber, wherein the policy related message is associated with the first Diameter interface;
determining that the policy related message lacks APN information and that the policy related message is associated with the first Diameter interface;
after determining that the policy related message associated with the first Diameter interface lacks APN information and while the DSR is in the multiple pool mode, using the subscriber identifier and the preconfigured APN information associated with the first Diameter interface to generate or identify a binding between the subscriber and a first policy and charging rules function (PCRF) server of a pool of PCRF servers associated with the first default APN; and
sending, to the first PCRF server, the policy related message received from the policy related node.

* * * * *